United States Patent
Amhamed et al.

(10) Patent No.: US 12,383,865 B2
(45) Date of Patent: Aug. 12, 2025

(54) MODIFIED KALINA SYSTEM FOR EFFICIENT POWER AND WATER PRODUCTION

(71) Applicant: Qatar Foundation for Education, Science and Community Development, Doha (QA)

(72) Inventors: Abdulkarem Amhamed, Doha (QA); Ahmed Abotaleb, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 489 days.

(21) Appl. No.: 17/919,021

(22) PCT Filed: Apr. 14, 2021

(86) PCT No.: PCT/QA2021/050005
§ 371 (c)(1),
(2) Date: Oct. 14, 2022

(87) PCT Pub. No.: WO2021/210999
PCT Pub. Date: Oct. 21, 2021

(65) Prior Publication Data
US 2023/0233995 A1 Jul. 27, 2023

Related U.S. Application Data

(60) Provisional application No. 63/009,566, filed on Apr. 14, 2020.

(51) Int. Cl.
*B01D 61/00* (2006.01)
*B01D 3/14* (2006.01)
(Continued)

(52) U.S. Cl.
CPC ......... *B01D 61/0023* (2022.08); *B01D 3/145* (2013.01); *B01D 61/002* (2013.01);
(Continued)

(58) Field of Classification Search
CPC .. B01D 61/0023; B01D 3/145; B01D 61/002; B01D 61/0022; B01D 2311/06;
(Continued)

(56) References Cited

U.S. PATENT DOCUMENTS 8,795,525 B2 8/2014 Mcginnis et al.
9,115,701 B2 8/2015 Mcginnis
(Continued)

FOREIGN PATENT DOCUMENTS

CA 3037695 A1 3/2018

OTHER PUBLICATIONS

International Search Report for related International Application No. PCT/QA2021/050005; report dated Oct. 21, 2021; (2 pages).
(Continued)

*Primary Examiner* — Pranav N Patel
(74) *Attorney, Agent, or Firm* — K&L Gates LLP (57) ABSTRACT

A new and innovative power and treated water co-generation system is provided that includes a modified Kalina cycle and a forward osmosis (FO) membrane. The Kalina cycle of the provided system is used for power production, whereas the system's FO process is used for water production. The provided system modifies a typical Kalina cycle to include a more efficient and relatively low-temperature heat source, while still utilizing the same working fluid, which is ammonia-water. The draw solution for the provided system's FO process is also ammonia-water, which is known and efficient for desalination and wastewater treatment. In some aspects, the working fluid of the system may be a specific ammonia-water composition including between 30-95% ammonia. The presently disclosed system combines the Kalina process and the FO process into an improved and innovative heat integration system to minimize energy requirements and enable operation at both small and large scales.

20 Claims, 4 Drawing Sheets

(51) Int. Cl.
  *C02F 1/04* (2023.01)
  *C02F 1/44* (2023.01)
  *F03G 7/04* (2006.01)
  *C02F 103/08* (2006.01)

(52) U.S. Cl.
  CPC .......... B01D 61/0022 (2022.08); C02F 1/043 (2013.01); C02F 1/445 (2013.01); F03G 7/045 (2021.08); *B01D 2311/06* (2013.01); *B01D 2313/221* (2022.08); *B01D 2313/243* (2013.01); *B01D 2313/246* (2013.01); *B01D 2313/501* (2022.08); *C02F 2103/08* (2013.01); *C02F 2303/10* (2013.01)

(58) Field of Classification Search
  CPC ........ B01D 2313/221; B01D 2313/243; B01D 2313/246; B01D 2313/501; B01D 2311/04; B01D 2311/2669; C02F 1/043; C02F 1/445; C02F 2103/08; C02F 2303/10; C02F 1/04; F03G 7/045; Y02A 20/124; Y02A 20/131; Y02W 10/30; Y02W 10/37; F01K 25/065
  See application file for complete search history.

(56) References Cited

U.S. PATENT DOCUMENTS

| | | |
|---|---|---|
| 9,822,021 B2 | 11/2017 | Mcginnis et al. |
| 10,143,970 B2 | 12/2018 | Iyer |
| 2010/0183903 A1* | 7/2010 | McGinnis ................ C02F 1/16 429/50 |
| 2010/0192575 A1 | 8/2010 | Al-Mayahi et al. |
| 2014/0319056 A1 | 10/2014 | Fuchigami et al. |
| 2018/0043308 A1 | 2/2018 | Iyer |

OTHER PUBLICATIONS

Written Opinion for related International Application No. PCT/QA2021/050005; report dated Oct. 21, 2021; (2 pages).

Mcginnis, et al.; "A novel ammonia-carbon dioxide osmotic heat engine for power generation"; Aug. 2007; ScienceDirect; Journal of Membrane Science 305; (7 pages).

Lin, et al.; "Hybrid Pressure Retarded Osmosis-Membrane Distillation System for Power Generation from Low-Grade Heat: Thermodynamic Analysis and Energy Efficiency"; Environ Sci Technol; May 2014; (1 page).

* cited by examiner

FIG. 1
PRIOR ART

| Flow | Pressure (bar) | Temperature (C) | Mass Flow (kg/s) | Vapor/Phase Fraction |
|---|---|---|---|---|
| 150 | 35.75 | 135 | 0.65 | 1 |
| 152 | 13.5 | 81.13 | 0.65 | 0.98 |
| 156 | 13.5 | 81.13 | 0.65 | 0.98 |
| 158 | 13.25 | 46 | 0.65 | 0.98 |
| 164 | 13 | 5.78 | 0.65 | 0 |
| 160 | 3 | 5 | 5.63 | 0 |
| 162 | 2.75 | 41 | 5.63 | 0 |
| 166 | 36.5 | 6.61 | 0.65 | 0 |
| 170 | 36.25 | 40.45 | 0.65 | 0 |
| 172 | 36 | 125 | 0.65 | 1 |
| 178 | 36 | 125 | 0 | 1 |
| 180 | 36 | 125 | 0.65 | 0 |
| 182 | 5 | 145 | 3.50 | 0 |
| 174 | 4.75 | 143.7 | 3.50 | 0 |
| 176 | 4.5 | 88.49 | 3.50 | 0 |

FIG. 2
PRIOR ART

| Process Parameter | Parameter Value |
|---|---|
| Power | 77.96 kW |
| Polytropic Efficiency | 73.8072 |
| Delta T | -53.87 °C |
| Delta P | 2225 kPa |
| Polytropic Exponent | 1.14 |
| Isentropic Exponent | 1.187666 |

MODIFIED KALINA SYSTEM FOR EFFICIENT POWER AND WATER PRODUCTION

CROSS-REFERENCE TO RELATED APPLICATIONS

The present application is a National Stage filing under 35 U.S.C. 371 of International Application No. PCT/QA2021/050005, filed on Apr. 14, 2021 which claims priority to and the benefit of U.S. Provisional Application 63/009,566, filed Apr. 14, 2020, the entirety of which is herein incorporated by reference.

TECHNICAL FIELD

The present application relates generally to the co-generation of power and fresh water. More specifically, the present application relates to a new and innovative power and treated water co-generation system that combines a Kalina cycle and a forward osmosis (FO) process.

BACKGROUND

Low-grade waste heat cannot be used for steam production in a conventional steam cycle. An alternative way to generate electricity at low temperature is a conventional Kalina power system. A conventional Kalina power system process maximizes the power output with a better heat recovery and without the demand of additional fuels. In general, Organic Rankin cycle (ORC), supercritical Rankin cycle, and Kalina power cycle are typically the suitable thermal technologies for low-grade heat recovery.

Due to the continuous demand for power and fresh water, an efficient and more economically feasible co-generation system than typical low-grade heat recovery systems is needed.

SUMMARY

The present application provides a new and innovative hybrid Kalina system that includes a forward osmosis (FO) membrane. The Kalina cycle of the provided system is used for power production, whereas the system's FO process is used for water production. The provided system modifies a typical Kalina cycle to be more efficient and require a relatively low-temperature heat source, while still utilizing the same working fluid, which is ammonia-water. The draw solution for the provided system's FO process is also ammonia-water, which is known and efficient for desalination and wastewater treatment. In at least some aspects, the provided hybrid Kalina system uses a particular ammonia-water composition (between 30-95% ammonia). The presently disclosed system combines the Kalina process and the FO process into an improved and novel heat integration system to minimize energy requirements and ensure smooth operation at both small and large scales.

In light of the disclosures herein, and without limiting the scope of the invention in any way, in a first aspect of the present disclosure, which may be combined with any other aspect listed herein unless specified otherwise, a power and treated water co-generation system includes a Kalina power turbine, a forward osmosis membrane, and a distillation column. The forward osmosis membrane is in fluid communication with the reject stream of the Kalina power turbine and with an untreated water stream such that the forward osmosis membrane receives the reject stream and the untreated water stream and thereby forms a product stream and a brine stream. The distillation column is in fluid communication with the product stream of the forward osmosis membrane such that the distillation column receives the product stream and thereby forms a distillation column overhead stream and a distillation column bottom stream. The Kalina power turbine is in fluid communication with the distillation column overhead stream such that the Kalina power turbine receives the distillation column overhead stream and thereby produces power and forms the reject stream. A first portion of the distillation column bottom stream is in fluid communication with a storage tank.

In a second aspect of the present disclosure, which may be combined with any other aspect listed herein unless specified otherwise, a working fluid of the Kalina power turbine is an ammonia-water mixture including ammonia in a range of 30-95% of the composition.

In a third aspect of the present disclosure, which may be combined with any other aspect listed herein unless specified otherwise, the power and treated water co-generation system includes a fluid pump in fluid communication with the product stream and arranged to pump the product stream to the distillation column.

In a fourth aspect of the present disclosure, which may be combined with any other aspect listed herein unless specified otherwise, the power and treated water co-generation system includes an economizer in fluid communication with a second portion of the distillation column bottom stream. The economizer is configured to heat the second portion of the distillation column bottom stream, and the heated second portion of the distillation column bottom stream is directed to the distillation column.

In a fifth aspect of the present disclosure, which may be combined with any other aspect listed herein unless specified otherwise, the power and treated water co-generation system includes an economizer in fluid communication with the distillation column overhead stream, the economizer configured to heat the distillation column overhead stream.

In a sixth aspect of the present disclosure, which may be combined with any other aspect listed herein unless specified otherwise, the first portion of the distillation column bottom stream is arranged to exchange heat with the distillation column overhead stream thereby heating the distillation column overhead stream.

In a seventh aspect of the present disclosure, which may be combined with any other aspect listed herein unless specified otherwise, the product stream is split into a first product stream and a second product stream prior to the distillation column receiving the product stream.

In an eighth aspect of the present disclosure, which may be combined with any other aspect listed herein unless specified otherwise, the first portion of the distillation column bottom stream is arranged to exchange heat with the second product stream thereby cooling the first portion of the distillation column bottom stream.

In a ninth aspect of the present disclosure, which may be combined with any other aspect listed herein unless specified otherwise, the reject stream of the Kalina power turbine is arranged to exchange heat with the first product stream thereby cooling the reject stream. The forward osmosis membrane is in fluid communication with the cooled reject stream.

In a tenth aspect of the present disclosure, which may be combined with any other aspect listed herein unless specified otherwise, the first product stream and the second product stream join into a third product stream, the distillation column being in fluid communication with the third product stream.

In an eleventh aspect of the present disclosure, which may be combined with any other aspect listed herein unless specified otherwise, the untreated water stream is in fluid communication with a source of seawater or wastewater.

In a twelfth aspect of the present disclosure, which may be combined with any other aspect listed herein unless specified otherwise, a method for power and treated water co-generation includes contacting a forward osmosis membrane with a reject stream of a Kalina power turbine and a untreated water stream thereby forming a product stream and a brine reject stream. The product stream is distilled with a distillation column thereby forming a distillation column bottom stream and a distillation column overhead stream. The distillation column overhead stream is expanded with the Kalina power turbine thereby producing power and forming the reject stream. A portion of the distillation column bottom stream is directed to a storage tank, the portion of the distillation column bottom stream being treated water.

In a thirteenth aspect of the present disclosure, which may be combined with any other aspect listed herein unless specified otherwise, the forward osmosis membrane is contacted concurrently with the reject stream of a Kalina power turbine and the untreated water stream.

In a fourteenth aspect of the present disclosure, which may be combined with any other aspect listed herein unless specified otherwise, the reject stream of the Kalina power turbine that the forward osmosis membrane is contacted with is a mixture including ammonia and water.

In a fifteenth aspect of the present disclosure, which may be combined with any other aspect listed herein unless specified otherwise, the mixture includes ammonia in the range of 30-95% of the composition.

In a sixteenth aspect of the present disclosure, which may be combined with any other aspect listed herein unless specified otherwise, the product stream formed by the forward osmosis membrane includes a lower concentration of ammonia than the reject stream.

In a seventeenth aspect of the present disclosure, which may be combined with any other aspect listed herein unless specified otherwise, the untreated water stream is saline water.

In an eighteenth aspect of the present disclosure, which may be combined with any other aspect listed herein unless specified otherwise, the method includes only an inorganic working fluid.

In a nineteenth aspect of the present disclosure, which may be combined with any other aspect listed herein unless specified otherwise, the method further includes exchanging heat between the distillation column overhead stream and the portion of the distillation column bottom stream thereby heating the distillation column overhead stream and cooling the portion of the distillation column bottom stream. The heated distillation column overhead stream is heated with an economizer. Heat may be exchanged between the cooled portion of the distillation column bottom stream and a portion of the product stream thereby cooling the cooled portion of the distillation column bottom stream.

In a twentieth aspect of the present disclosure, which may be combined with any other aspect listed herein unless specified otherwise, the method further includes reboiling and a portion of the distillation column bottom stream Additional features and advantages of the disclosed system and method are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present application provides a new and innovative hybrid system and method for the co-generation of power and treated water. The provided system includes a modified Kalina system for generating power and a forward osmosis system for generating treated water. The modified Kalina system and forward osmosis system are integrated in the provided system in a way that enables heat integration to minimize energy requirements of the provided hybrid system thereby enabling operation at both small and large scales. For instance, the provided system overcomes a bottleneck of the typical Kalina power system by reducing the temperature required of a heat source as compared to a typical Kalina power system. Stated differently, the provided system enables using a low-temperature grade heat source as compared to a high-temperature grade heat source. Further, the provided system overcomes a bottleneck of the typical forward osmosis system by reducing the draw solution regeneration energy consumption for water treatment as compared to typical forward osmosis systems. In at least some instances, the provided system may consume about 15% less energy for the same amount of production (e.g., 15% more efficient) as compared to typical Kalina power systems and forward osmosis systems.

The configuration of the provided system is enabled by utilizing the same fluid (e.g., an ammonia-water mixture) for the Kalina turbine's working fluid as the forward osmosis membrane's draw solution. Additionally, some typical Kalina turbines may use an ammonia-water working fluid and some typical forward osmosis system may use an ammonia-water draw solution. As such, the provided system may be implemented by constructing new power plants or by modifying existing power plants.

An additional advantage of the provided method is that it only includes an inorganic working fluid, and is therefore an oil-free process. The oil-free nature of the provided method eliminates the risk of contamination, reduces environmental impact, reduces maintenance costs, and reduces energy costs.

Various components of the presently disclosed system may be in fluid communication with one another, such as through piping. Two components in fluid communication with one another may be in direct fluid communication (e.g., piping directly connects the two components) or may have intermediate components or processing between the two components, such as filters, pumps, heaters, odor removal vessels, etc.

Figure 1:
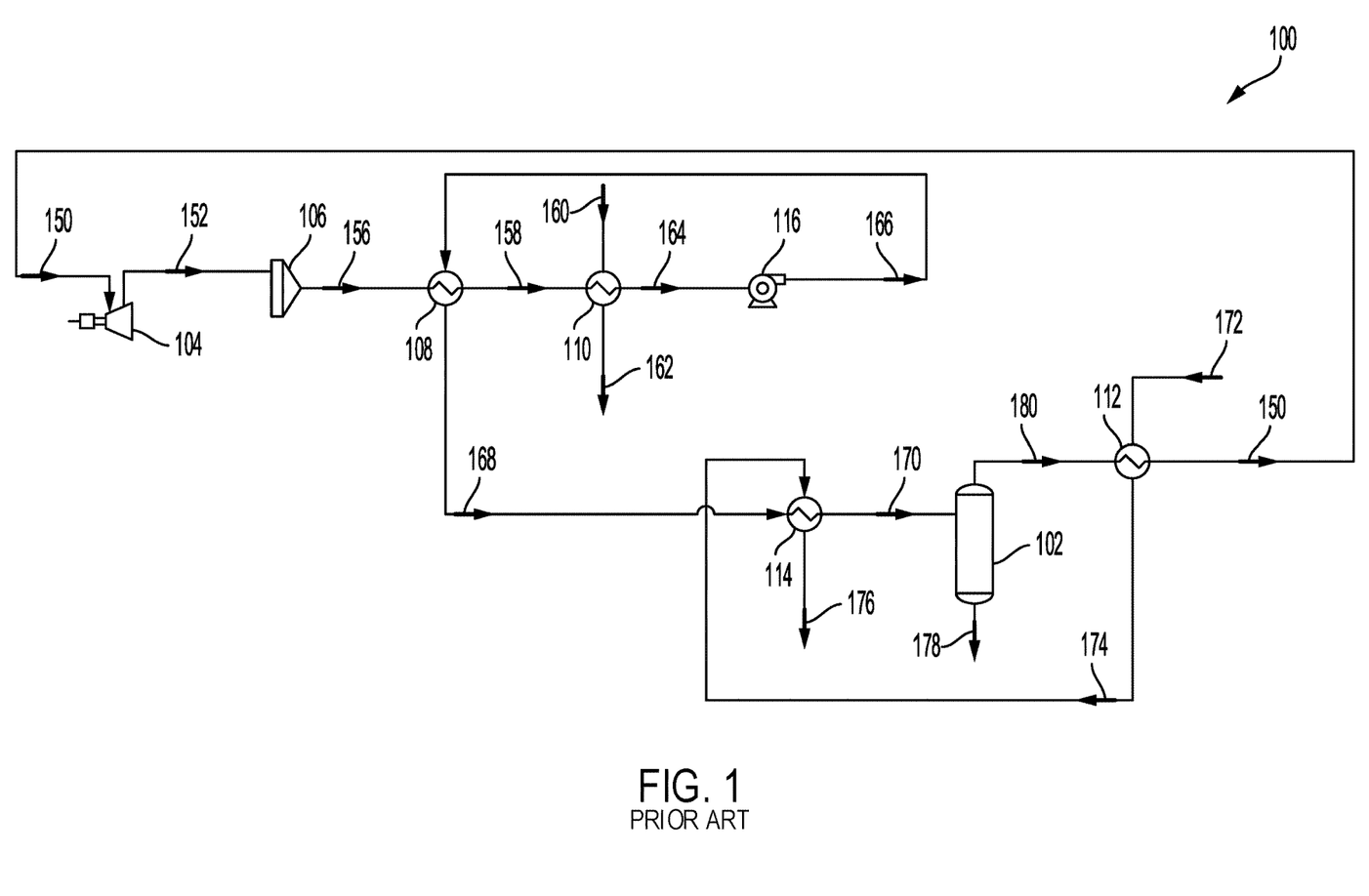
FIG. 1 illustrates a schematic flow diagram of a conventional Kalina power system.

FIG. 1 illustrates a schematic of a conventional Kalina power system 100 that includes a separator 102, a turbine 104, a low-temperature regenerator (LTRGN) (not illustrated), a T-junction 106, a pump 116, multiple heat exchangers 108-114, a throttle valve (not illustrated), and a heat source (e.g., streams 172, 174, 176). Superheated vapor in the stream 150 expands in the turbine 104 to form the output stream 152 and to produce power. The output stream 152 is directed to the T-junction 106, which may mix the output stream 152 with makeup working fluid to compensate for the fluid loss from the turbine 104 and form the stream 156. The stream 156 exchanges heat with a stream 166 at the heat exchanger 108 thereby cooling the stream 156 into the stream 158 and heating the stream 166 into the stream 168. The cooled stream 158 is further cooled at the heat exchanger 110 into the stream 164. An input stream 160 and output stream 162 of cold water are in fluid communication with the heat exchanger 110 to effect the cooling. The stream 164 is input into the pump 116 which outputs the stream 166. Cooling the output stream 152 at the heat exchanger 108 while heating the pumped fluid in the stream 166 at the heat exchanger 108 is part of a thermodynamic cycle. The LTRGN reduces the load on the heat exchanger 108. Similarly, a high-temperature regenerator (HTRGN) (not illustrated) also reduces the load on the heat exchanger 108. The LTRGN and HTRGN components internally recover the heat and increase the cycle thermal efficiency.

The stream 168 is further heated at the heat exchanger 114 into the stream 170 via heat supplied by the stream 174. The stream 170 is fed to the separator 102 which thereby physically separates the stream 170 into an overhead stream 180 and a bottom stream 178. The separator 102 utilizes gravity to cause a denser fluid (i.e. liquid) to settle to the bottom of the separator 102 to be withdrawn as the bottom stream 178 and to cause a less dense fluid (i.e. vapor) to be withdrawn from the top of the separator 102 as the overhead stream 180. The separator 102 may be referred to as a flash drum. The overhead stream is heated at the heat exchanger 112 into the stream 150 via heat supplied by the stream 172. The stream 150 is then recycled back to the turbine 104. The arrangement of the components in the conventional Kalina power system 100 requires that the heat source (e.g., the streams 172, 174, 176) supplied to the heat exchanger 112 be a high-temperature heat source to sufficiently heat the recycled stream 150 for input into the turbine 104. As such, this high-temperature heat source is a bottleneck of the conventional Kalina power system 100.

Figure 2:
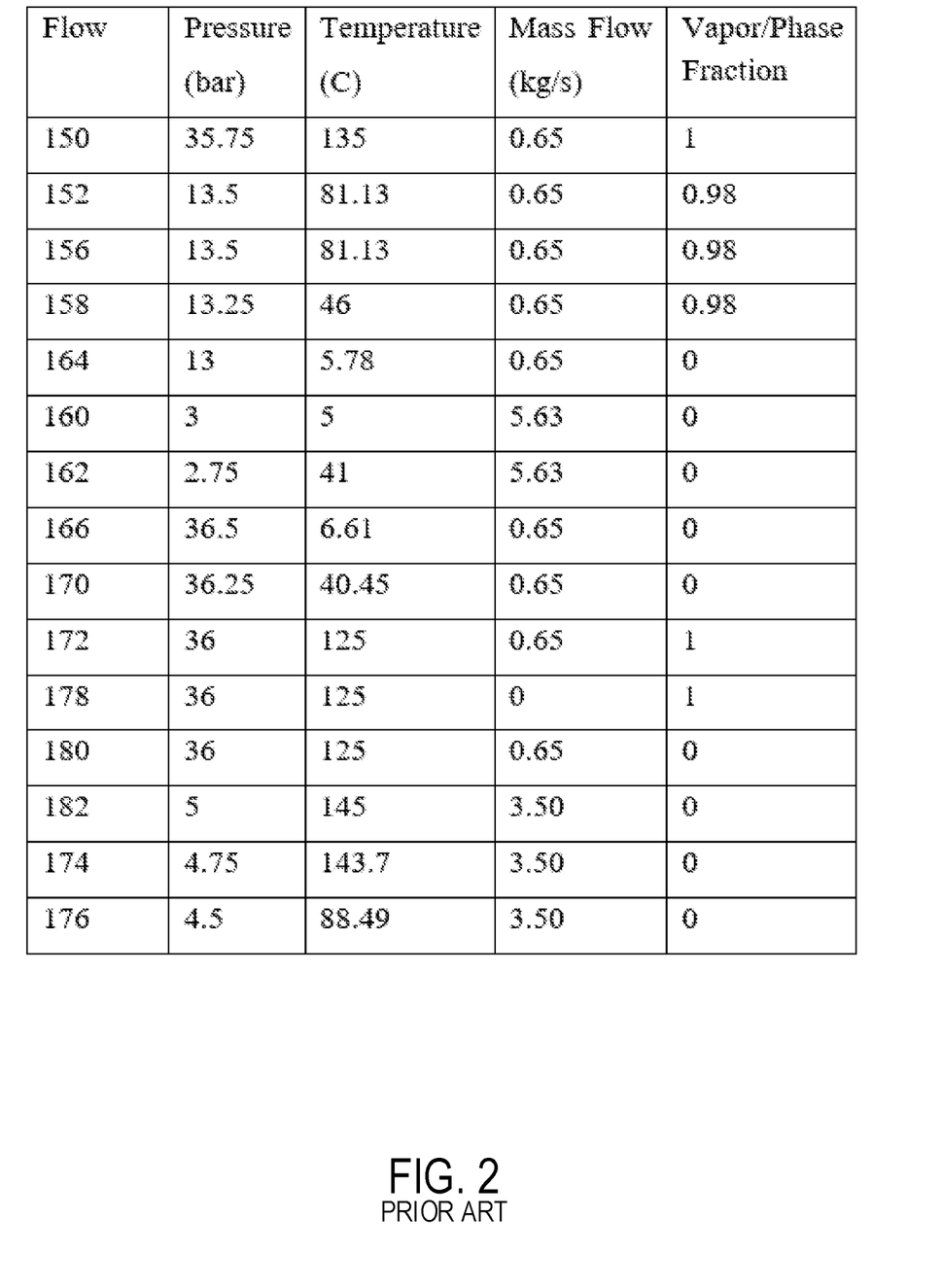
FIG. 2 illustrates a table of the mass and heat balance of a conventional Kalina power system.
Figure 3:
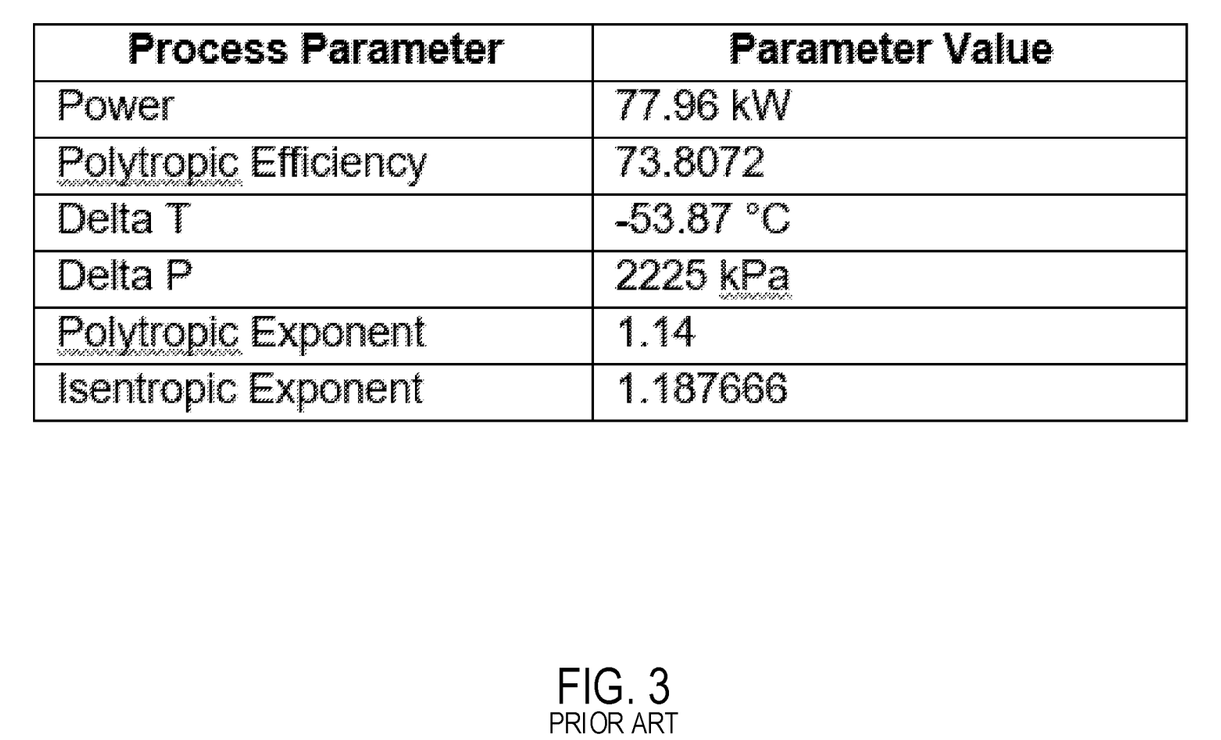
FIG. 3 illustrates a table of turbine process parameters of a conventional Kalina power system.

The conventional low-temperature Kalina power system 100 operates with a temperature at the separator 102 of about 110° C. to 150° C., with about 20% to 80% vapor fraction, and with about 0.85-0.97 turbine concentration. The mass and heat balance of a conventional Kalina power system 100 is shown in the table illustrated in FIG. 2. Turbine process parameters of a conventional Kalina power system 100 are shown in the table illustrated in FIG. 3. Pumping power requirements of a conventional Kalina power system 100 are typically about 3.261 kW. Stated differently, the specific power consumption of a conventional Kalina power system 100 is typically about 115 kW/kg.

Figure 4:
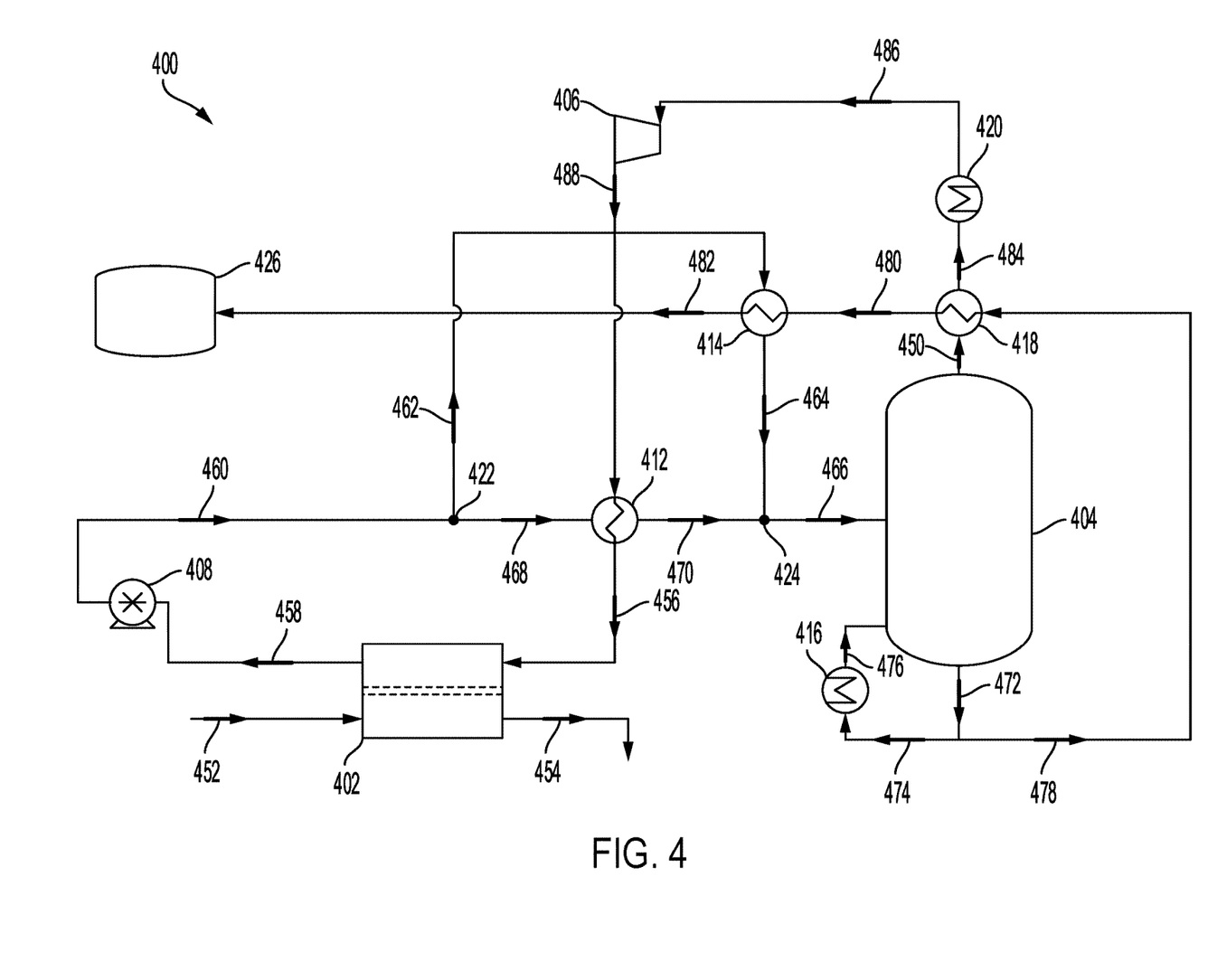
FIG. 4 illustrates a schematic flow diagram of a system for the co-generation of power and treated water, according to an aspect of the present disclosure.

FIG. 4 illustrates a schematic flow diagram of an example system 400 for the co-generation of power and treated water. In at least one example, the system 400 may be located in a power plant. The example system 400 modifies the conventional Kalina power system 100 in part by including an arrangement of components that combine a Kalina cycle with a forward osmosis process in order to co-generate power and treated water. The Kalina cycle is a thermodynamic process for converting thermal energy into usable mechanical power that uses a solution of two fluids with different boiling points for its working fluid. Forward osmosis is the process of spontaneous water diffusion across a semi-permeable forward osmosis membrane in response to a difference in solute concentrations (i.e. osmotic pressures) on either side of the semi-permeable membrane. Untreated (e.g., contaminated) water may enter the semi-permeable forward osmosis membrane on one side (e.g., the feed side) and treated (e.g., decontaminated or fresh) water mixed with a draw solution may exit on the other side (e.g., the draw side) of the membrane. The treated water must then be separated from the draw solutes to obtain the treated water as a final product. To effect the combination, the example system 400 includes a forward osmosis (FO) membrane 402, a distillation column 404, and a turbine 406 all in fluid communication with one another.

The turbine 406 may be a suitable turbine for use in a Kalina cycle. For example, the turbine 406 may be a typical back-pressure turbine.

The FO membrane 402 may be any suitable membrane for use in a forward osmosis process. For instance, the FO membrane 402 may be semi-permeable. In various examples, the FO membrane 402 may be a cellulosic membrane (e.g., an asymmetric cellulose acetate membrane or asymmetric cellulose triacetate membrane), a polyamide-based thin film composite membrane, a thin film composite polyelectrolyte-based membrane, or another suitable forward osmosis membrane.

The FO membrane 402 is in fluid communication with a suitable source of untreated water (not illustrated), such as for example, a source of saline water (e.g., seawater) or a source of waste water. An untreated water stream 452 may be directed from the source of untreated water to the FO membrane 402. The FO membrane 402 is also in fluid communication with the turbine 406. A reject stream 488 of the turbine 406 may be directed to the FO membrane 402 as the draw solution for the FO membrane 402. As will be described more below, in some aspects, the reject stream 488 may be cooled to the reject stream 456, which is then the draw solution that contacts the FO membrane 402. Stated differently, in such aspects, a cooled reject stream 488 of the turbine 406 is the draw solution for the FO membrane 402.

In at least some aspects, the FO membrane 402 may be contacted concurrently by the draw solution (e.g., the reject stream 456) and by the untreated water stream 452 thereby forming a brine/waste stream 454 and a product stream 458. The FO membrane 402 may filter contaminants from the untreated water stream 452 which are then included in the brine/waste stream 454. For example, the FO membrane 402 may filter salt to desalinate high saline water. In some instances, the untreated water stream 452 may be heated or cooled (e.g., via a heat exchanger) prior to contacting the FO membrane 402 if the temperature of the untreated water stream 452 is not suitable for the FO membrane 402 to function effectively. For example, an FO membrane 402 typically functions effectively at temperatures less than 40° C. and an untreated water stream 452 may exceed that temperature during certain times of the year in certain areas of the world. In an example, the untreated water stream 452 may be about 25° C. when it contacts the FO membrane 402.

In at least some instances, the working fluid of the turbine 406 is an ammonia-water mixture. In such aspects, the reject stream 456 of the turbine 406, and thereby the draw solution of the FO membrane 402, is the same ammonia-water mixture. The ammonia-water mixture may, in some examples, include a concentration of ammonia in a range of 30-95% of the mixture. In such aspects, the working fluid of the turbine 406 and the fluid within the system 400 is therefore inorganic and oil free, which can be beneficial for environmental sustainability.

In at least some aspects, brine/waste stream 454 may be directed to an area of the power plant in which the system 400 is located for disposal. For instance, the FO membrane 402 may be in fluid communication with a storage tank and the brine/waste stream 454 may be directed to the storage tank for later disposal. The product stream 458 is a diluted draw solution stream that includes a lower concentration of ammonia than the reject stream 456. Stated differently, the product stream 458 is a less contaminated untreated water stream 452 that includes a mixture of treated (e.g., decontaminated or fresh) water and ammonia solutes from the reject stream 456. The treated water may be separated from the ammonia solutes at the distillation column 404.

In various aspects, the FO membrane 402 may be in fluid communication with a pump 408. In such aspects, the pump 408 may be in fluid communication with the distillation column 404. The product stream 458 may be directed to the pump 408 that pumps the product stream 458 and outputs a product stream 460. In some examples, the product stream 460 may be at a temperature of about 30-35° C.

In at least some aspects, the product stream 460 may split into a product stream 462 and a product stream 468 at the split 422. The heat integration that may be provided by the product stream 462 and the product stream 468 will be described more below. In such aspects, these streams may rejoin at the split 424 into the product stream 466 which is directed to the distillation column 404.

The distillation column 404 is configured to generate an overhead stream 450 and a bottom stream 472 from a feed stream (e.g., the product stream 466). As compared to the separator 102 that utilizes gravitational separation, the distillation column 404 separates the product stream 466 into its components based on the difference in volatilities (e.g., boiling points) between the components. The bottom stream 472 may be treated (e.g., decontaminated or fresh) water whereas the overhead stream 450 may be a mixture of water and ammonia. In this way, the distillation column 404 adjusts the ammonia-water mixture in the product stream 466 for Kalina expansion in the turbine 406 (e.g., the overhead stream 450) while also filtering water in the product stream 466 from any traces of ammonia to generate treated water (e.g., the bottom stream 472).

In at least some aspects, a portion of the bottom stream 472 may be reboiled. In such aspects, the distillation column 404 may be in fluid communication with an economizer 416 and a portion of the bottom stream 472 may be directed to the economizer 416. For instance, the bottom stream 472 may be split into the bottom stream 474 and the bottom stream 478, and the bottom stream 474 may be directed to the economizer 416. The economizer 416 may boil the bottom stream 474 and inject vapor as the stream 476 into the distillation column 404 to drive separation in the distillation column 404. The treated water of the bottom stream 478 may be directed to a storage tank 426 for storing treated/fresh water.

The heat supplied to the economizer 416 to boil the bottom stream 474 can be supplied by any suitable low-temperature grade heat source (not illustrated). In at least some aspects, the low-temperature grade heat source supplies heat to the economizer 416 at a temperature of around 95° C. For example, heat may be supplied by a slip stream (e.g., a low-pressure steam) of a power plant turbine, a solar collector, waste heat generated by a production plant (e.g., cement, iron, steel, ceramics, petrochemical, etc.), or flue gas from an incinerator. The use of a low-temperature grade heat source helps reduce the energy consumption of the system 400 as compared to the conventional Kalina power system 100 that requires a high-temperature grade heat source as described above.

As stated above, the distillation column 404 is in fluid communication with the turbine 406. The overhead stream 450 is directed to the turbine 406 thereby recycling the working fluid (e.g., ammonia-water mixture) of the turbine 406 back to the turbine 406. In at least some aspects, the overhead stream 450 may be heated by an economizer 420 to the overhead stream 486 to prepare the overhead stream 450 for expansion in the turbine 406. In one example, the economizer 420 may heat the overhead stream 450 such that the overhead stream 486 is at a temperature of about 90° C. The heat supplied to the economizer 420 can be supplied by any suitable low-temperature grade heat source (not illustrated). In at least some aspects, the low-temperature grade heat source supplies heat to the economizer 420 at a temperature of around 95° C. For example, heat may be supplied by a slip stream (e.g., a low-pressure steam) of a power plant turbine, a solar collector, waste heat generated by a production plant (e.g., cement, iron, steel, ceramics, petrochemical, etc.), or flue gas from an incinerator. The use of a low-temperature grade heat source helps reduce the energy consumption of the system 400 as compared to the conventional Kalina power system 100 that requires a high-temperature grade heat source as described above.

The turbine 406 may then produce power using, at least in part, the working fluid from the overhead stream 450. The power produced by the turbine 406 may be directed to where it is needed or to storage. As part of the power production process, the turbine 406 may generate the reject stream 488 that is directed to the FO membrane 402 to be used as draw solution for the FO membrane 402.

It at least some aspects, the components and streams of the system 400 may be arranged to provide heat integration that reduces the energy consumption of the system 400. For instance, the FO membrane 402 typically functions effectively at temperatures less than 40° C., though the reject stream 488 of the turbine 406 is above 40° C. In at least some examples, the product stream 468, which may be at a temperature of about 30-35° C., may exchange heat with the reject stream 488 at a heat exchanger 412 to cool the reject stream 488 to the reject stream 456 and to heat the product stream 468 to the product stream 470. The reject stream 488 may be cooled such that the reject stream 456 is at a temperature less than 40° C. when it contacts the FO membrane 402. Cooling the reject stream 456 in this way helps avoid the need for external coolants in the system 400, which aids in environmental sustainability efforts. Heating the product stream 468 in this way helps increase the temperature of the feed stream (e.g., the heated product stream 470 joins into the product stream 466 at the split 424) to the distillation column 404, which can help reduce the energy required for driving separation in the distillation column 404. For instance, the energy of the heat source required at the economizer 416 may be reduced.

In at least some aspects, the distillation column 404 includes a heat integration system in an overhead condenser section of the distillation column 404. For instance, the bottom stream 478, which may be at a temperature of about 90° C., may exchange heat with the overhead stream 450 at a heat exchanger 418 to cool the bottom stream 478 to the bottom stream 480 and to heat the overhead stream 450 to the overhead stream 484. In at least some aspects, the bottom stream 480 may further exchange heat with the product stream 462 at a heat exchanger 414 to cool the bottom stream 480 to the bottom stream 482 and to heat the product stream 462 to the product stream 464. The bottom stream 482 may be at about room temperature (e.g., about 20-22° C.). Cooling the bottom stream 478 in this way helps avoid the need for external coolants in the system 400, which aids in environmental sustainability efforts. Heating the product stream 462 in this way helps increase the temperature of the feed stream (e.g., the heated product stream 464 joins into the product stream 466 at the split 424) to the distillation column 404, which can help reduce the energy required for driving separation in the distillation column 404. For instance, the energy of the heat source required at the economizer 416 may be reduced.

Additionally, heating the overhead stream 450 at the heat exchanger 418 to the overhead stream 484 prior to the economizer 420 helps reduce the energy required at the economizer 420 to heat the overhead stream 484 to the about 90° C. of the overhead stream 486. For instance, the heat exchange at the heat exchanger 418 heats the overhead stream 450 partway and therefore the economizer 420 has to effect less of a temperature increase from the overhead stream 484 to the overhead stream 486.

In addition, by using the reject stream 456 (e.g., the heated reject stream 488) as the draw solution to the FO membrane 402, the provided system 400 reduces the energy consumption to regenerate the draw solution as compared to typical forward osmosis systems.

In the preceding description and in FIG. 4, various streams have been split into multiple reference numerals for purposes of describing different portions of the system 400. It should be appreciated where a single stream has been split merely for descriptive purposes. For example, the overhead stream 486 is a heated overhead stream 484 which is a heated overhead stream 450. As such, the overhead stream 450 is directed from the distillation column 404 to the turbine 406. In another example, the product stream 470 is a heated product stream 468, and the product stream 464 is a heated product stream 462, which then join into the product stream 466. As such, the product stream 466 is a heated product stream 460 which is a pumped product stream 458. In another example, the bottom stream 482 is a cooled bottom stream 480 which is a cooled bottom stream 478 which is a portion of the bottom stream 472. As such, a portion of the bottom stream 472 may be in fluid communication with a storage tank 426.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A power and treated water co-generation system comprising:
   a Kalina power turbine;
   a forward osmosis membrane in fluid communication with a reject stream of the Kalina power turbine and with an untreated water stream such that the forward osmosis membrane receives the reject stream and the untreated water stream and thereby forms a product stream and a brine stream;
   a distillation column in fluid communication with the product stream of the forward osmosis membrane such that the distillation column receives the product stream and thereby forms a distillation column overhead stream and a distillation column bottom stream,
   wherein the Kalina power turbine is in fluid communication with the distillation column overhead stream such that the Kalina power turbine receives the distillation column overhead stream and thereby produces power and forms the reject stream, and
   wherein a first portion of the distillation column bottom stream is in fluid communication with a storage tank.

2. The power and treated water co-generation system of claim 1, wherein a working fluid of the Kalina power turbine is an ammonia-water mixture including ammonia in a range of 30-95% of the composition.

3. The power and treated water co-generation system of claim 1, further comprising a fluid pump in fluid communication with the product stream and arranged to pump the product stream to the distillation column.

4. The power and treated water co-generation system of claim 1, further comprising an economizer in fluid communication with a second portion of the distillation column bottom stream, the economizer configured to heat the second portion of the distillation column bottom stream, wherein the heated second portion of the distillation column bottom stream is directed to the distillation column.

5. The power and treated water co-generation system of claim 1, further comprising an economizer in fluid communication with the distillation column overhead stream, the economizer configured to heat the distillation column overhead stream.

6. The power and treated water co-generation system of claim 1, wherein the first portion of the distillation column bottom stream is arranged to exchange heat with the distillation column overhead stream thereby heating the distillation column overhead stream.

7. The power and treated water co-generation system of claim 1, wherein the product stream is split into a first product stream and a second product stream prior to the distillation column receiving the product stream.

8. The power and treated water co-generation system of claim 7, wherein the first portion of the distillation column bottom stream is arranged to exchange heat with the second product stream thereby cooling the first portion of the distillation column bottom stream.

9. The power and treated water co-generation system of claim 7, wherein the reject stream of the Kalina power turbine is arranged to exchange heat with the first product stream thereby cooling the reject stream, the forward osmosis membrane being in fluid communication with the cooled reject stream.

10. The power and treated water co-generation system of claim 7, wherein the first product stream and the second product stream join into a third product stream, the distillation column being in fluid communication with the third product stream.

11. The power and treated water co-generation system of claim 1, wherein the untreated water stream is in fluid communication with a source of seawater or wastewater.

12. A method for power and treated water co-generation comprising:
 contacting a forward osmosis membrane with a reject stream of a Kalina power turbine and a untreated water stream thereby forming a product stream and a brine reject stream;
 distilling the product stream with a distillation column thereby forming a distillation column bottom stream and a distillation column overhead stream;
 expanding the distillation column overhead stream with the Kalina power turbine thereby producing power and forming the reject stream; and
 directing a portion of the distillation column bottom stream to a storage tank, the portion of the distillation column bottom stream being treated water.

13. The method for power and treated water co-generation of claim 12, wherein the forward osmosis membrane is contacted concurrently with the reject stream of a Kalina power turbine and the untreated water stream.

14. The method for power and treated water co-generation of claim 12, wherein the reject stream of the Kalina power turbine that the forward osmosis membrane is contacted with is a mixture including ammonia and water.

15. The method for power and treated water co-generation of claim 14, wherein the mixture includes ammonia in the range of 30-95% of the composition.

16. The method for power and treated water co-generation of claim 14, wherein the product stream formed by the forward osmosis membrane includes a lower concentration of ammonia than the reject stream.

17. The method for power and treated water co-generation of claim 12, wherein the untreated water stream is saline water.

18. The method for power and treated water co-generation of claim 12, wherein the method includes only an inorganic working fluid.

19. The method for power and treated water co-generation of claim 12, further comprising:
 exchanging heat between the distillation column overhead stream and the portion of the distillation column bottom stream thereby heating the distillation column overhead stream and cooling the portion of the distillation column bottom stream;
 heating the heated distillation column overhead stream with an economizer; and
 exchanging heat between the cooled portion of the distillation column bottom stream and a portion of the product stream thereby cooling the cooled portion of the distillation column bottom stream.

20. The method for power and treated water co-generation of claim 12, further comprising reboiling a portion of the distillation column bottom stream.

* * * * *